US012612483B2

(12) United States Patent
Waku et al.

(10) Patent No.: US 12,612,483 B2
(45) Date of Patent: Apr. 28, 2026

(54) RESIN COMPOSITION FOR THREE-DIMENSIONAL SHAPING, METHOD FOR PRODUCING THREE-DIMENSIONALLY SHAPED OBJECT, AND THREE-DIMENSIONALLY SHAPED OBJECT

(71) Applicant: DEXERIALS CORPORATION, Tochigi (JP)

(72) Inventors: Kaori Waku, Tochigi (JP); Kouki Hatsuda, Tochigi (JP); Minoru Nagashima, Tochigi (JP); He Yang, Tochigi (JP)

(73) Assignee: DEXERIALS CORPORATION, Tochigi (JP)

( * ) Notice: Subject to any disclaimer, the term of this patent is extended or adjusted under 35 U.S.C. 154(b) by 245 days.

(21) Appl. No.: 18/559,666

(22) PCT Filed: Apr. 22, 2022

(86) PCT No.: PCT/JP2022/018635
§ 371 (c)(1),
(2) Date: Nov. 8, 2023

(87) PCT Pub. No.: WO2022/249823
PCT Pub. Date: Dec. 1, 2022

(65) Prior Publication Data

US 2024/0239939 A1 Jul. 18, 2024

(30) Foreign Application Priority Data

May 26, 2021 (JP) ................................ 2021-088143

(51) Int. Cl.
*B33Y 70/00* (2020.01)
*A01K 85/00* (2006.01)
(Continued)

(52) U.S. Cl.
CPC ........ *C08F 283/01* (2013.01); *A01K 85/1897* (2022.02); *B33Y 70/00* (2014.12);
(Continued)

(58) Field of Classification Search
None
See application file for complete search history.

(56) References Cited

U.S. PATENT DOCUMENTS

2021/0230341 A1* 7/2021 Hiratani ................ B33Y 40/20

FOREIGN PATENT DOCUMENTS

JP 2017-088681 5/2017
JP 2000-219821 8/2020
JP 2020-200437 12/2020

OTHER PUBLICATIONS

Preparation of functionalized poly(caprolactone diol)/castor oils blends to be applied as photocrosslinkable tissue adhesives, Journal of Applied Polymer Science, vol. 137, Issue 37 (Feb. 10, 2020).
(Continued)

*Primary Examiner* — Mohammad M Ameen
(74) *Attorney, Agent, or Firm* — IPUSA, PLLC

(57) ABSTRACT

To provide a resin composition for three-dimensional shaping. The resin composition includes a polyfunctional urethane (meth)acrylate having a molecular weight of 700 or greater and 1,300 or less.

6 Claims, 4 Drawing Sheets

(51) Int. Cl.
*B33Y 80/00* (2015.01)
*C08F 283/01* (2006.01)
*B29C 64/124* (2017.01)
*B29K 33/00* (2006.01)
*B29L 31/00* (2006.01)
*B33Y 10/00* (2015.01)

(52) U.S. Cl.
CPC ............ *B33Y 80/00* (2014.12); *B29C 64/124* (2017.08); *B29K 2033/08* (2013.01); *B29L 2031/7002* (2013.01); *B33Y 10/00* (2014.12)

(56) References Cited

OTHER PUBLICATIONS

Office Action mailed on Aug. 26, 2025 issued with respect to the corresponding Korean Patent Application No. 10-2023-7039414.
International Search Report for PCT/JP2022/018635 mailed on Jun. 28, 2022.

* cited by examiner

RESIN COMPOSITION FOR THREE-DIMENSIONAL SHAPING, METHOD FOR PRODUCING THREE-DIMENSIONALLY SHAPED OBJECT, AND THREE-DIMENSIONALLY SHAPED OBJECT

TECHNICAL FIELD

The present invention relates to a resin composition for three-dimensional shaping, a method for producing a three-dimensionally shaped object, and a three-dimensionally shaped object.

BACKGROUND ART

In recent years, three-dimensional (3D) printing technology for producing three-dimensionally shaped objects using a resin has been developed. Since anyone can easily form a three-dimensionally shaped object using a 3D printer applying the above-described 3D printing technology, use of a 3D printer has been also expanded to domestic use, as the price of a 3D printer is getting lower.

Within the 3D printing technology, stereolithography has characteristics that a liquid-state photocurable resin composition is used and precision of a resulting shaped object is high.

As the above-described photocurable resin composition, for example, an active energy ray-curable resin composition is proposed. The active energy ray-curable resin composition includes a polycaprolactone polyol having a number average molecular weight of 300 to 900, and a urethane (meth)acrylate having a weight average molecular weight of 3,000 to 30,000 obtained by reacting an aliphatic or alicyclic diisocyanate and a hydroxyl group-containing (meth)acrylate (see, for example, PTL 1).

Moreover, a film coat composition is proposed. The film coat composition includes a urethane (meth)acrylate including, as a structural unit, a polycaprolactone polyol having a molecular weight of 800 to 8,000, and a monofunctional (meth)acrylate where a glass transition temperature (Tg) of monofunctional (meth)acrylate is 90° C. or higher after curing (see, for example, PTL 2).

CITATION LIST

Patent Literature

[PTL 1] Japanese Unexamined Patent Application Laid-Open (JP-A) No. 2017-88681
[PTL 2] Japanese Unexamined Patent Application Laid-Open (JP-A) No. 2000-219821

SUMMARY OF INVENTION

Technical Problem

However, the urethane (meth)acrylate used in PTLs 1 and 2 has a structure different from the polyfunctional urethane (meth)acrylate used in the present invention, and has a large molecular weight and a high viscosity. Therefore, the urethane (meth)acrylate used in PTLs 1 and 2 is not suitable for use in three-dimensional shaping. Since the compositions of PTLs 1 and 2 include a low molecular weight monofunctional monomer having strong odor and imparting high skin irritation, moreover, the compositions of PTLs 1 and 2 are not suitable for domestic use.

According to stereolithography of a bottom-up system, moreover, a three-dimensionally shaped object 12 is formed along a direction of gravity relative to a shaping surface 11*a* of a shaping platform 11, as a linear guide 13 is elevated in the direction indicated with the arrow as illustrated in FIGS. 1A and 1B. Therefore, the stereolithography has a problem that the three-dimensionally shaped object 12 easily breaks at a thin part. Moreover, the three-dimensionally shaped object is cured within a short period, thus stress is likely to remain within the three-dimensionally shaped object due to shrinkage during curing, which may cause breakage of a three-dimensionally shaped object in the process of three-dimensional shaping. In FIGS. 1A and 1B, the numeric reference 14 represents an arm, the numeric reference 15 represents an UV light source, the numeric reference 16 represents a shaping tank, and the numeric reference 17 represents a resin composition for three-dimensional shaping (liquid-state).

The present invention aims to solve the above-described various problems existing in the related art and to achieve the following object. Specifically, the present invention relates to a resin composition for three-dimensional shaping, method for producing a three-dimensionally shaped object, and three-dimensionally shaped object, which can stably shape a desired three-dimensionally shaped object having low odor and excellent mechanical properties.

Solution to Problem

Means for solving the above-described problems are as follows.

<1> A resin composition for three-dimensional shaping, the resin composition including:

a polyfunctional urethane (meth)acrylate having a molecular weight of 700 or greater and 1,300 or less.

<2> The resin composition for three-dimensional shaping, according to <1>, wherein the polyfunctional urethane (meth)acrylate includes a polycaprolactone skeleton.

<3> The resin composition for three-dimensional shaping, according to <2>, wherein the polycaprolactone skeleton has a molecular weight of 500 or greater and 1,000 or less.

<4> The resin composition for three-dimensional shaping, according to <2> or <3>, wherein the polyfunctional urethane (meth)acrylate including the polycaprolactone skeleton is represented by General Formula (1) or General Formula (2) below,

[Chem . 1]

General Formula (1)

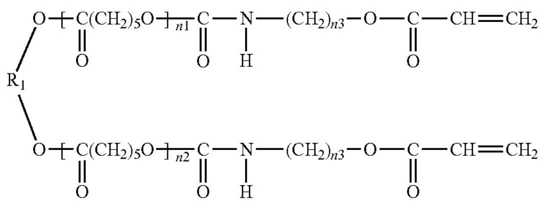

where, in General Formula (1), $R_1$ is a straight-chain alkyl group or a straight-chain alkyl ether group, n1+n2 is an integer of 2 or greater and 9 or less, and n3 is an integer of 1 or greater,

[Chem . 2]

General Formula (2)

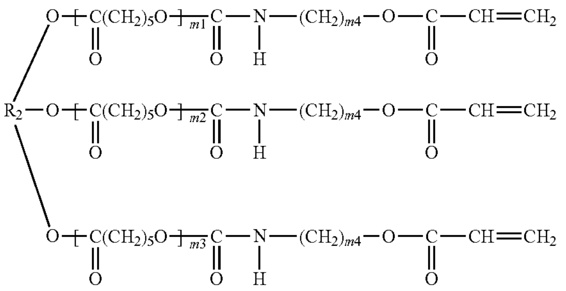

where, in General Formula (2), $R_2$ is a branched-chain alkyl group, m1+m2+m3 is an integer of 3 or greater and 9 or less, and m4 is an integer of 1 or greater.

<5> The resin composition for three-dimensional shaping, according to any one of <1> to <4>, wherein an amount of the polyfunctional urethane (meth) acrylate is 90% by mass or greater relative to a total amount of the resin composition for three-dimensional shaping.

<6> The resin composition for three-dimensional shaping, according to any one of <1> to <5>, the resin composition further including:

a photopolymerization initiator.

<7> The resin composition for three-dimensional shaping, according to any one of <1> to <6>, wherein the resin composition for three-dimensional shaping has a viscosity of 0.1 Pa's or greater and 10 Pa·s or less at 25° C.

<8> A method for producing a three-dimensionally shaped object, the method including:

immersing a shaping platform into the resin composition for three-dimensional shaping according to any one of <1> to <7> contained in a shaping tank, and irradiating the resin composition with active energy rays at a shaping surface of the shaping platform to cure the resin composition, wherein the method is a method for producing a three-dimensionally shaped object according to stereolithography.

<9> The method for producing a three-dimensionally shaped object, according to <8>, wherein cured layers of the resin composition for three-dimensional shaping are stacked along a direction of gravity relative to the shaping surface of the shaping platform.

<10> A three-dimensionally shaped object, including:

cured products of the resin composition for three-dimensional shaping according to any one of <1> to <7>, where the cured products are stacked.

<11> The three-dimensionally shaped object, according to <10>, wherein the three-dimensionally shaped object is an artificial bait.

Advantageous Effects of Invention

The present invention can solve the above-described various problems existing in the related art, can achieve the above-described object, and can provide a resin composition for three-dimensional shaping, method for producing a three-dimensionally shaped object, and three-dimensionally shaped object, which can stably shape a desired three-dimensionally shaped object having low odor and excellent mechanical properties.

DESCRIPTION OF EMBODIMENTS

Resin Composition for Three-Dimensional Shaping

Figure 1A:
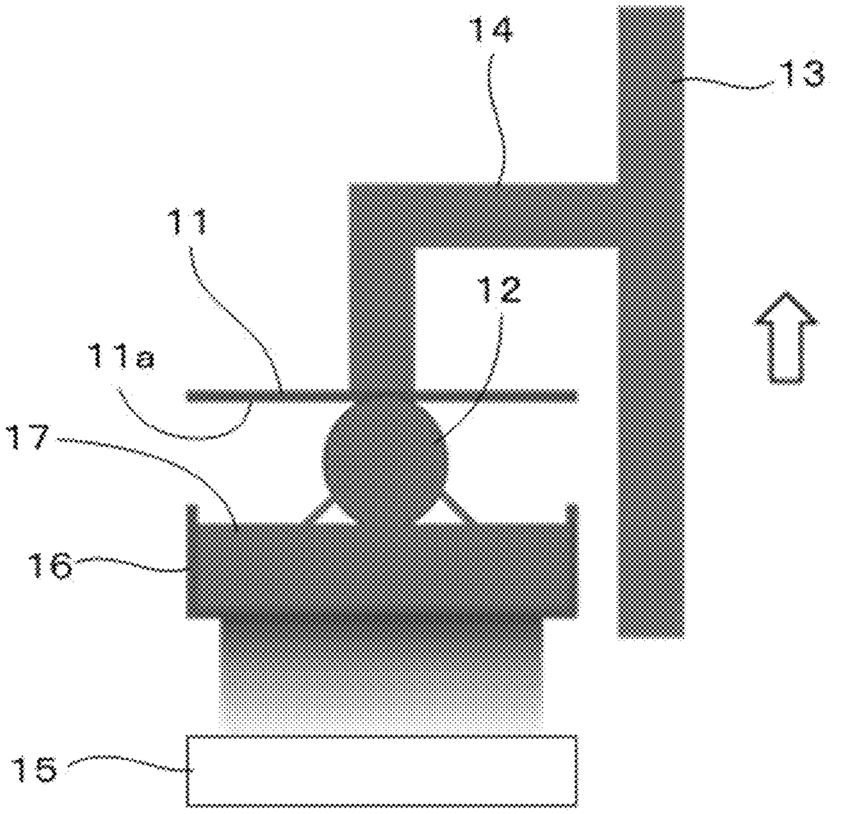
FIG. 1A is a schematic view illustrating an example of a method for producing a three-dimensionally shaped object according to stereolithography of a bottom-up system.
Figure 1B:
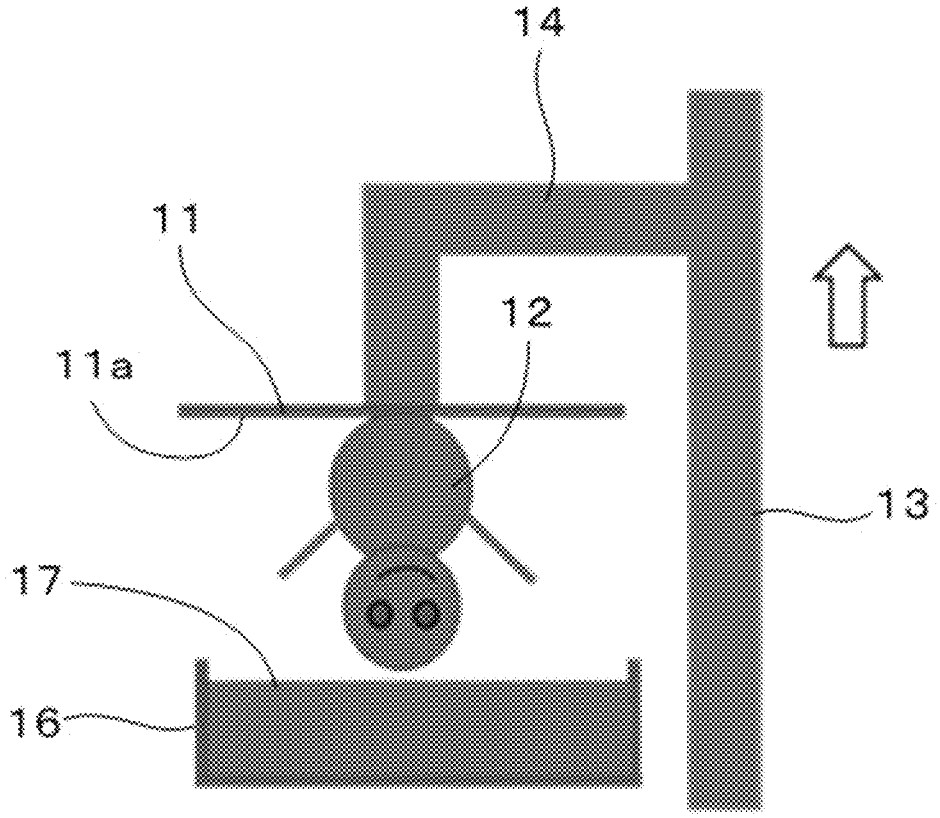
FIG. 1B is a schematic view illustrating an example of the method for producing the three-dimensionally shaped object according to the stereolithography of the bottom-up system.

The resin composition for three-dimensional shaping of the present invention includes a polyfunctional urethane (meth)acrylate having a molecular weight of 700 or greater and 1,300 or less, preferably further includes a photopolymerization initiator, and may further include other components, as necessary.

The resin composition for three-dimensional shaping of the present invention includes a polyfunctional urethane (meth)acrylate having a molecular weight of 700 or greater and 1,300 or less. Therefore, the resin composition for three-dimensional shaping has a viscosity suitable for three-dimensional shaping, can be cured by heat or light, and forms a three-dimensionally shaped object having excellent mechanical properties (elastic modulus and strength). Moreover, the polyfunctional urethane (meth)acrylate having a molecular weight of 700 or greater and 1,300 or less does not include a low molecular weight monofunctional monomer that releases strong odor and causes a strong skin irritation. Therefore, the polyfunctional urethane (meth)acrylate releases low odor. Since the polyfunctional urethane (meth) acrylate having a molecular weight of 700 or greater and 1,300 or less has a large molecular weight and does not easily penetrate into skin, moreover, skin irritability of the polyfunctional urethane (meth)acrylate is low.

With regard to an evaluation of odor, if a 5% weight loss temperature of the polyfunctional urethane (meth)acrylate as measured by thermogravimetry (TGA) is 300° C. or higher, the polyfunctional urethane (meth)acrylate has a low volatility to minimize release of odor, resulting in low odor.

The skin irritation (Primary Irritation Index (P. I. I.)) can be evaluated by directly applying a sample onto shaved skin of a rabbit. It is generally known that urethane (meth)

acrylates other than acrylates (methacrylates or urethane (meth)acrylates having a large molecular weight) give a low skin irritation.

<Polyfunctional Urethane (Meth)Acrylate>

The polyfunctional urethane (meth)acrylate is not particularly limited, except that the polyfunctional urethane (meth) acrylate includes a urethane structure and includes two or more acrylic groups or methacrylic groups. The polyfunctional urethane (meth)acrylate may be appropriately selected according to the intended purpose.

A molecular weight of the polyfunctional urethane (meth) acrylate is 700 or greater and 1,300 or less, preferably 750 or greater and 1,000 or less.

When the polyfunctional urethane (meth)acrylate has a molecular weight of 700 or greater and 1,300 or less, the resin composition for three-dimensional shaping has a viscosity suitable for three-dimensional shaping.

Examples of a calculation method for the molecular weight include a method where the molecular weight is calculated from a hydroxyl value $OH_A$, the number of hydroxyl groups $OH_B$ per molecule, and a molecular weight (56.1) of potassium hydroxide according to the following equation, and the like. The hydroxyl value can be measured according to JIS K 0070:1992. The number of hydroxyl groups per molecule can be measured by titration of a potassium hydroxide/ethanol solution.

$$\text{Molecular weight} = \frac{56.1 \times 10^3 \times OH_B}{OH_A} \quad \text{[Math. 1]}$$

The polyfunctional urethane (meth)acrylate preferably includes, as a main skeleton, an aliphatic polyester skeleton, an aliphatic polycarbonate skeleton, a polycaprolactone skeleton, or the like. As flexibility can be imparted to a three-dimensionally shaped object, the polyfunctional urethane (meth)acrylate particularly preferably includes a polycaprolactone skeleton.

The molecular weight of the polycaprolactone skeleton is preferably 500 or greater and 1,000 or less. When the molecular weight of the polycaprolactone skeleton is less than 500, a proportion of the caprolactone skeleton included in a molecule of the polyfunctional urethane (meth)acrylate including the polycaprolactone skeleton becomes small so that sufficient flexibility may not be imparted to a resulting three-dimensionally shaped object, forming the excessively hard three-dimensionally shaped object.

The molecular weight of the polycaprolactone skeleton can be measured in the same manner as the molecular weight of the polyfunctional urethane (meth)acrylate.

The polyfunctional urethane (meth)acrylate including the polycaprolactone skeleton is preferably represented by General Formula (1) or General Formula (2) below.

[Chem. 3]

General Formula (1)

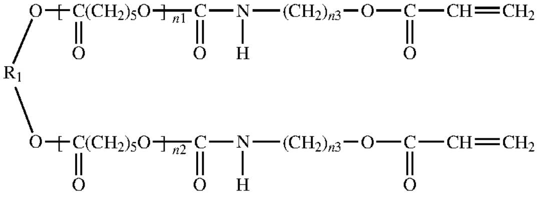

In General Formula (1), $R_1$ is a straight-chain alkyl group or a straight-chain alkyl ether group, n1+n2 is an integer of 2 or greater and 9 or less, and n3 is an integer of 1 or greater.

$R_1$ is a straight-chain alkyl group or a straight-chain alkyl ether group, examples of which include $C_2H_2$, $C_2H_2OC_2H_2$, $C_2H_4$, $C_2H_4OC_2H_4$, $C(CH_3)_2(CH_2)_2$, and the like.

[Chem. 4]

General Formula (2)

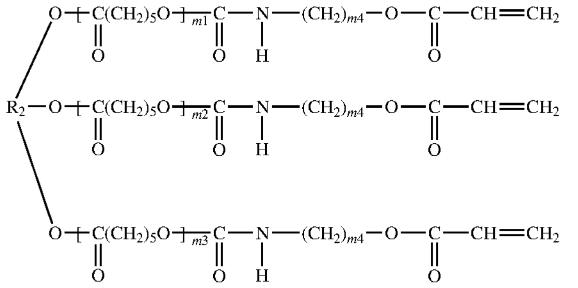

In General Formula (2), $R_2$ is a branched-chain alkyl group, m1+m2+m3 is an integer of 3 or greater and 9 or less, and m4 is an integer of 1 or greater.

$R_2$ is a branched-chain alkyl group, examples of which include $CH_2CHCH_2$, $CH_3C(CH_2)_3$, $CH_3CH_2C(CH_2)_3$, and the like.

The polyfunctional urethane (meth)acrylate including the polycaprolactone skeleton may be appropriately synthesized for use. Alternatively, a commercial product of the polyfunctional urethane (meth)acrylate including the polycaprolactone skeleton may be used.

As a synthesis method of the polyfunctional urethane (meth)acrylate including the polycaprolactone skeleton, for example, isocyanate (meth)acrylate (e.g., 2-isocyanatoethyl acrylate) is blended with polycaprolactone polyol (e.g., polycaprolactone diol or polycaprolactone triol) so that the isocyanate (meth)acrylate is 0.9 equivalent relative to the hydroxyl value of the polycaprolactone polyol, and the resulting mixture is stirred at 60° C. for 3 days in a sealed container to react the mixture to thereby synthesize a polyfunctional urethane (meth)acrylate including a polycaprolactone skeleton.

As the polycaprolactone polyol, a commercial product may be used. Examples of the commercial product include PLACCEL 2050, PLACCEL 305, PLACCEL 308 (all available from Daicel Corporation), and the like.

Examples of the commercial product of the isocyanate (meth)acrylate include KARENZ AOI, KARENZ MOI (both available from Showa Denko K.K.), and the like.

The polyfunctional urethane (meth)acrylate including the polycaprolactone skeleton for use in the present invention does not use a combination of polycaprolactone polyol, diisocyanate, and a (meth)acrylate including a hydroxyl group, which is used in formation of a urethane (meth) acrylate of a related art. The polyfunctional urethane (meth) acrylate including the polycaprolactone skeleton for use in the present invention is formed by introducing (meth)acrylic groups at terminals of polycaprolactone polyols with urethane bonds using isocyanate (meth)acrylate, thus the molecular weight of the polyfunctional urethane (meth) acrylate can be controlled to the range of 700 or greater and 1,300 or less.

The amount of the polyfunctional urethane (meth)acrylate is preferably 90% by mass or greater, more preferably 95% by mass or greater, relative to a total amount of the resin composition for three-dimensional shaping.

When the amount of the polyfunctional urethane (meth) acrylate is 90% by mass or greater, a resulting resin composition for three-dimensional shaping is substantially free from a low molecular weight monofunctional monomer releasing strong odor and causing a strong skin irritation, thus the resin composition for three-dimensional shaping that has low odor and low skin irritability and is suitable for three-dimensional shaping can be obtained.

<Photopolymerization Initiator>

As the photopolymerization initiator, a compound capable of generating radicals upon light irradiation, particularly irradiation of UV rays having a wavelength of 220 nm to 500 nm is suitably used.

Examples of the photopolymerization initiator include acetophenone, 2,2-diethoxyacetophenone, p-dimethylaminoacetophenone, benzophenone, 2-chlorobenzophenone, p,p'-dichlorobenzophenone, p,p-bisdiethylaminobenzophenone, Michler's ketone, benzyl, benzoin, benzoin methyl ether, benzoin ethyl ether, benzoin isopropyl ether, benzoin-n-propyl ether, benzoin isobutyl ether, benzoin-n-butyl ether, benzyl methyl ketal, thioxanthone, 2-chlorothioxanthone, 2-hydroxy-2-methyl-1-phenylpropanone, 1-(4-isopropylphenyl)$_2$-hydroxy-2-methylpropanone, methyl benzoylformate, 1-hydroxycyclohexyl phenyl ketone, azobisisobutyronitrile, benzoylperoxide, di-tert-butylperoxide, and the like. The above-listed examples may be used alone or in combination.

Moreover, preferred is a photopolymerization initiator having an absorption in a visible range, as LEDs (wavelength of 405 nm) have been used for light sources of photocuring-type shaping devices. Examples of the above-mentioned photopolymerization initiator include 2,4,6-trimethylbenzoyl-diphenylphosphine oxide, bis(2,4,6-trimethylbenzoyl)phenylphosphine oxide, and the like.

The amount of the photopolymerization initiator is preferably 1% by mass or greater, more preferably 3% by mass or greater, relative to a total amount of the resin composition for three-dimensional shaping. Moreover, the amount of the photopolymerization initiator is preferably 10% by mass or less.

<Other Components>

Other components are not particularly limited, and may be appropriately selected according to the intended purpose. Examples of the above-mentioned other components include stabilizers, surface treating agents, colorants, viscosity modifiers, adhesion promoters, antioxidants, anti-aging agents, crosslinking promoters, UV absorbers, plasticizers, preservatives, dispersing agents, pH adjustors, and the like.

For the viscosity of the resin composition for three-dimensional shaping of the present invention, the viscosity of the resin composition for three-dimensional shaping at 25° C. is preferably 0.1 Pa·s or greater and 10 Pa·s or less, more preferably 0.1 Pa·s or greater and 9 Pa·s or less, and yet more preferably 0.1 Pa·s or greater and 8 Pa·s or less. When the viscosity of the resin composition at 25° C. is 0.1 Pa·s or greater and 10 Pa·s or less, the resin composition for three-dimensional shaping is suitably used for a method for producing a three-dimensionally shaped object according to stereolithography.

For example, the viscosity can be measured by measuring the resin composition for three-dimensional shaping by a rotational rheometer (device name: AR-G2, available from TA Instruments) in the environment of 25° C. at a shear rate of 100 (1/s).

The glass transition temperature (Tg) of the resin composition for three-dimensional shaping is preferably −60° ° C. or higher and 50° C. or lower, more preferably −20° C. or higher and 30° C. or lower. When the glass transition temperature is −60° C. or higher and 50° C. or lower, a resulting cured product has sufficient hardness to maintain a shape of the cured product.

The glass transition temperature can be measured by a dynamic mechanical analyzer (DMA: Dynamic Mechanical Analysis, product name: RSA-3, available from TA Instruments). Specifically, a temperature at the maximum point of tan δ (loss modulus/storage modulus) measured in the measuring conditions (sample size: width 5 mm×length 20 mm, frequency: 1 MHz) is determined as a glass transition temperature.

The method for producing a three-dimensionally shaped object using the resin composition for three-dimensional shaping of the present invention is not particularly limited, and may be appropriately selected according to the intended purpose. Examples of the method include a method for producing a three-dimensionally shaped object according to stereolithography.

Method for Producing Three-Dimensionally Shaped Object

The method for producing a three-dimensionally shaped object of the present invention is a method for producing a three-dimensionally shaped object according to stereolithography.

The method for producing the three-dimensionally shaped object includes immersing a shaping platform into the resin composition for three-dimensional shaping of the present invention contained in a shaping tank, and irradiating the resin composition for three-dimensional shaping with active energy rays at a shaping surface of the shaping platform to cure the resin composition. The method for producing the three-dimensionally shaped object may further include other steps, as necessary.

In the present invention, stereolithography of a bottom-up system, where cured layers of the resin composition for three-dimensional shaping are stacked along a direction of gravity relative to the shaping surface of the shaping platform, is preferred.

Specifically, the method for producing the three-dimensionally shaped object of the present invention is a method where active energy rays are selectively applied to a layer of the resin composition for three-dimensional shaping based on shape data of a three-dimensionally shaped object, which is a shaping target, to form and obtain a cured layer having a desired pattern, a layer of an uncured resin composition for three-dimensional shaping is supplied to be in contact with the cured layer, active energy rays are applied to form a freshly cured layer continuous with the previously formed cured layer in the similar manner, and the above-described process of layer stacking is repeated to obtain a three-dimensionally shaped object, which is a final product.

Examples of the active energy rays include UV rays, electron beams, X rays, radial rays, high frequency waves, and the like. Among the above-listed examples, UV rays having a wavelength of 300 nm to 400 nm are preferably used in view of economic reasons. As a light source for the light irradiation, a UV laser, a high-pressure mercury lamp, an ultra-high-pressure mercury lamp, a low-pressure mercury lamp, a xenon lamp, a halogen lamp, a metal halide lamp, a UV light emitting diode (LED), a UV fluorescent lamp, or the like can be used. Examples of the UV laser include diode-pumped solid-state lasers, Ar lasers, He—Cd lasers, and the like.

(Three-Dimensionally Shaped Object)

The three-dimensionally shaped object of the present invention includes cured products of the resin composition for three-dimensional shaping of the present invention, where the cured products are stacked.

Use of the three-dimensionally shaped object is not particularly limited, and may be appropriately selected according to the intended purpose. For example, the three-dimensionally shaped object can be applied for a variety of uses, such as sports equipment, medical or care products, prosthetic limbs, dentures, prosthetic bones, industrial machines and devices, precision machine tools, electric and electronic devices, electric and electronic parts, building materials, artificial baits (lures), and the like. Among the above-listed examples, artificial baits are preferred in view of the reasons described below.

<Artificial Bait>

The artificial bait (lure) has a structure mimicking a body part of small fish. The artificial bait formed using the resin composition for three-dimensional shaping of the present invention, which can be shaped by a 3D printer of stereolithography, does not have odor derived from a low-molecular weight monofunctional monomer, thus a repulsive reaction from targeted fish can be avoided. Since there is no odor derived from a low molecular weight monofunctional monomer, moreover, odor does not obstruct the scent (scent of amino acid) that attracts fish, when the scent (scent of amino acid) is added to the artificial bait.

Moreover, the resin composition for three-dimensional shaping of the present invention has biodegradability, thus the resin composition for three-dimensional shaping can be decomposed by enzymes in water. Moreover, a biodegradable colorant may be mixed in the resin composition for three-dimensional shaping of the present invention, and the resin composition for three-dimensional shaping may be shaped using a UV curable-type 3D printer of an inkjet system or the like to shape an artificial bait having colorful tones, in which many colors are present in one three-dimensionally shaped object, without coating or the like.

Figure 7:
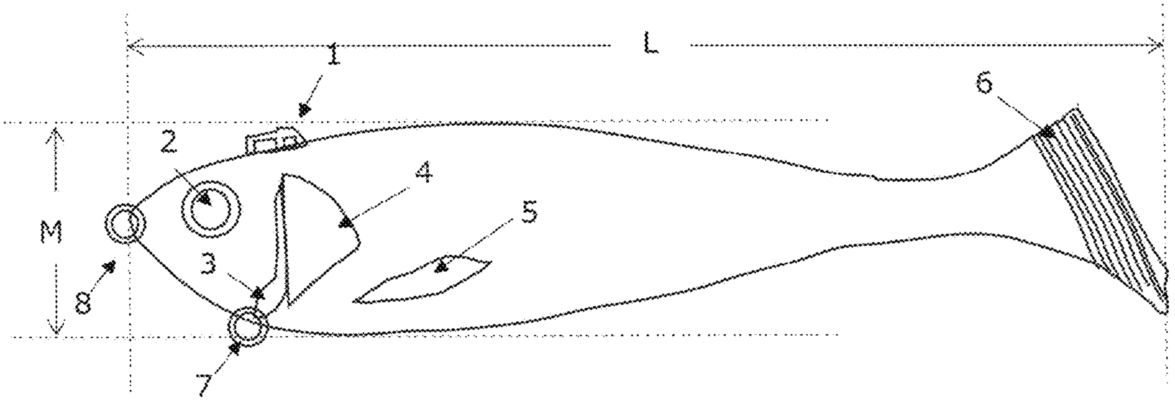
FIG. 7 is a schematic view illustrating an example of an artificial bait.

As illustrated in FIG. 7, the artificial bait (lure) has a structure mimicking a body part of small fish. Moreover, the artificial bait has several hooks 1, 7, and 8 at some parts according to points to which a fishing line is connected, or for connecting with a fish hook, as necessary. Considering water resistance, the artificial bait has several fins, as necessary, and preferably has a fin 3, a pectoral fin 4, a pectoral fin 5, and a tail fin 6. A size of the artificial bait corresponds to a tolerance range of a 3D printer, but the size (length L, height M) may be appropriately adjusted. In FIG. 7, the numeric reference 2 is a fish eye.

EXAMPLES

Examples of the present invention will be described hereinafter, but the following examples shall not be construed as limiting the scope of the present invention in any way.

Example 1

Synthesis of Polyfunctional Urethane (Meth)Acrylate Including Polycaprolactone Skeleton In a 300 mL three-necked flask, 100 g (0.71 mol) of 2-isocyanatoethyl acrylate (product name: KARENZ AOI, available from Showa Denko K.K.) was blended with 209 g (0.39 mol) of PLACCEL 205U (PCL205U, polycaprolactone diol, molecular weight: 530, available from Daicel Corporation) so that the 2-isocyanatoethyl acrylate was 0.9 equivalent relative to the hydroxyl value of the polycaprolactone diol. The flask was sealed, and the resulting mixture was stirred at 60° C. for 3 days to react, to thereby yield a colorless liquid (polyfunctional urethane (meth)acrylate including a polycaprolactone skeleton).

The obtained liquid was measured by a Fourier Transform Infrared Spectrometer (FT-IR, device name: Nicolet iS2, available from Thermo Fisher Scientific Inc.) to confirm that the peak at approximately 2, 250 $cm^{-1}$ derived from isocyanate and the peak at 3, 100 $cm^{-1}$ to 3, 600 $cm^{-1}$ derived from a hydroxyl group (OH) were lost, and a peak at approximately 1,550 $cm^{-1}$ derived from an amide (H—N—C═O) bond was newly formed.

Preparation of Resin Composition for Three-Dimensional Shaping

Next, 4 parts by mass of a photopolymerization initiator (Omnirad TPO-H, available from IGM Resins B.V.) was added to 100 parts by mass of the obtained polyfunctional urethane (meth)acrylate including the polycaprolactone skeleton, and the resulting mixture was mixed to prepare a resin composition for three-dimensional shaping.

Example 2

A colorless liquid (polyfunctional urethane (meth)acrylate including a polycaprolactone skeleton) was obtained in the same manner as in Example 1, except that 209 g (0.39 mol) of PLACCEL 205U (PCL205U, polycaprolactone diol, molecular weight: 530, available from Daicel Corporation) was replaced with 217 g (0.39 mol) of PLACCEL 305 (PCL305, polycaprolactone triol, molecular weight: 550, available from Daicel Corporation).

Preparation of Resin Composition for Three-Dimensional Shaping

Next, 4 parts by mass of a photopolymerization initiator (Omnirad TPO-H, available from IGM Resins B.V.) was added to 100 parts by mass of the obtained polyfunctional urethane (meth)acrylate including the polycaprolactone skeleton, and the resulting mixture was mixed to prepare a resin composition for three-dimensional shaping of Example 1.

Example 3

A colorless liquid (polyfunctional urethane (meth)acrylate including a polycaprolactone skeleton) was obtained in the same manner as in Example 1, except that 209 g (0.39 mol) of PLACCEL 205U (PCL205U, polycaprolactone diol, molecular weight: 530, available from Daicel Corporation) was replaced with 335 g (0.39 mol) of PLACCEL 308 (PCL308, polycaprolactone triol, molecular weight: 850, available from Daicel Corporation).

Preparation of Resin Composition for Three-Dimensional Shaping

Next, 4 parts by mass of a photopolymerization initiator (Omnirad TPO-H, available from IGM Resins B.V.) was added to 100 parts by mass of the obtained polyfunctional urethane (meth)acrylate including the polycaprolactone skeleton, and the resulting mixture was mixed to prepare a resin composition for three-dimensional shaping of Example 3.

Comparative Example 1

A colorless liquid (polyfunctional urethane (meth)acrylate including a polycaprolactone skeleton) was obtained in the same manner as in Example 1, except that 209 g (0.39 mol) of PLACCEL 205U (PCL205U, polycaprolactone diol, molecular weight: 530, available from Daicel Corporation) was replaced with 118 g (0.39 mol) of PLACCEL 303 (PCL303, polycaprolactone triol, molecular weight: 300, available from Daicel Corporation).

Preparation of Resin Composition for Three-Dimensional Shaping

Next, 4 parts by mass of a photopolymerization initiator (Omnirad TPO-H, available from IGM Resins B.V.) was added to 100 parts by mass of the obtained polyfunctional urethane (meth)acrylate including the polycaprolactone skeleton, and the resulting mixture was mixed to prepare a resin composition for three-dimensional shaping of Comparative Example 1.

Comparative Example 2

A colorless liquid (polyfunctional urethane (meth)acrylate including a polycaprolactone skeleton) was obtained in the same manner as in Example 1, except that 209 g (0.39 mol) of PLACCEL 205U (PCL205U, polycaprolactone diol, molecular weight: 530, available from Daicel Corporation) was replaced with 492 g (0.39 mol) of PLACCEL 312 (PCL312, polycaprolactone triol, molecular weight: 1,250, available from Daicel Corporation).

Preparation of Resin Composition for Three-Dimensional Shaping

Next, 4 parts by mass of a photopolymerization initiator (Omnirad TPO-H, available from IGM Resins B.V.) was added to 100 parts by mass of the obtained polyfunctional urethane (meth)acrylate including the polycaprolactone skeleton, and the resulting mixture was mixed to prepare a resin composition for three-dimensional shaping of Comparative Example 2.

Comparative Example 3

As a resin composition for three-dimensional shaping of Comparative Example 3, the product name: "ELEGOO," UV resin (gray) for stereolithography 3D printers, available from ELEGOO, INC. was provided.

The present inventors analyzed the composition of "ELEGOO" of Comparative Example 3. As a result, it was found that the composition included a low molecular weight acryl monomer (acryloylmorpholine) and high molecular weight urethane acrylate.

Comparative Example 4

As a resin composition for three-dimensional shaping of Comparative Example 4, the product name: "eSun," LED UV resin for stereolithography 3D printers, suitable for photocurable PLA resin 3D printers, available from eSun (Shenzhen Esun Industrial Co., Ltd.) was provided.

The present inventors analyzed the composition of "eSun" of Comparative Example 4. As a result, it was found that the composition included a low molecular weight acryl monomer (acryloylmorpholine) and high molecular weight urethane acrylate.

Next, various properties of each of the obtained resin compositions for three-dimensional shaping were evaluated in the following manner. The results are presented in Tables 1 and 2.

<Viscosity>

The viscosity of each of the obtained resin compositions for three-dimensional shaping was measured by a rotational rheometer (device name: AR-G2, available from TA Instruments) in the environment of 25° C. at a shear rate of 100 (1/s).

<Three-Dimensional Shaping>

Figure 2:
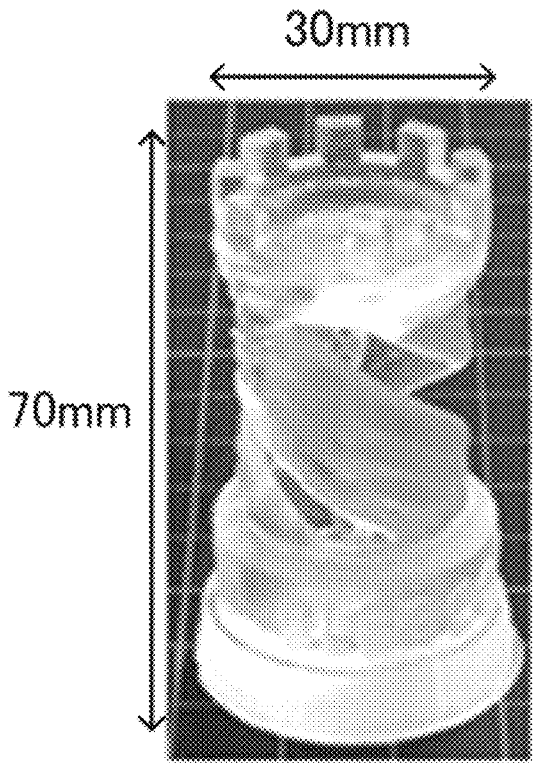
FIG. 2 is a photograph depicting an example of the three-dimensionally shaped object three-dimensionally shaped in Examples 1 to 3 and Comparative Example 4.
Figure 4:
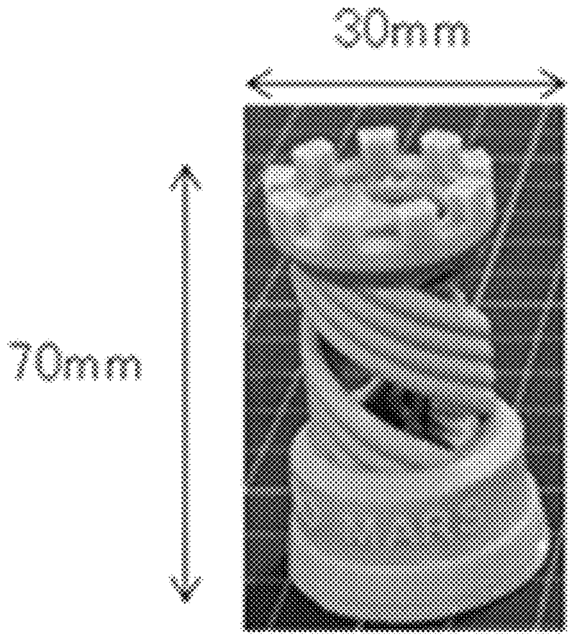
FIG. 4 is a photograph depicting an example of the three-dimensionally shaped object three-dimensionally shaped in Comparative Example 3.
Figure 5:
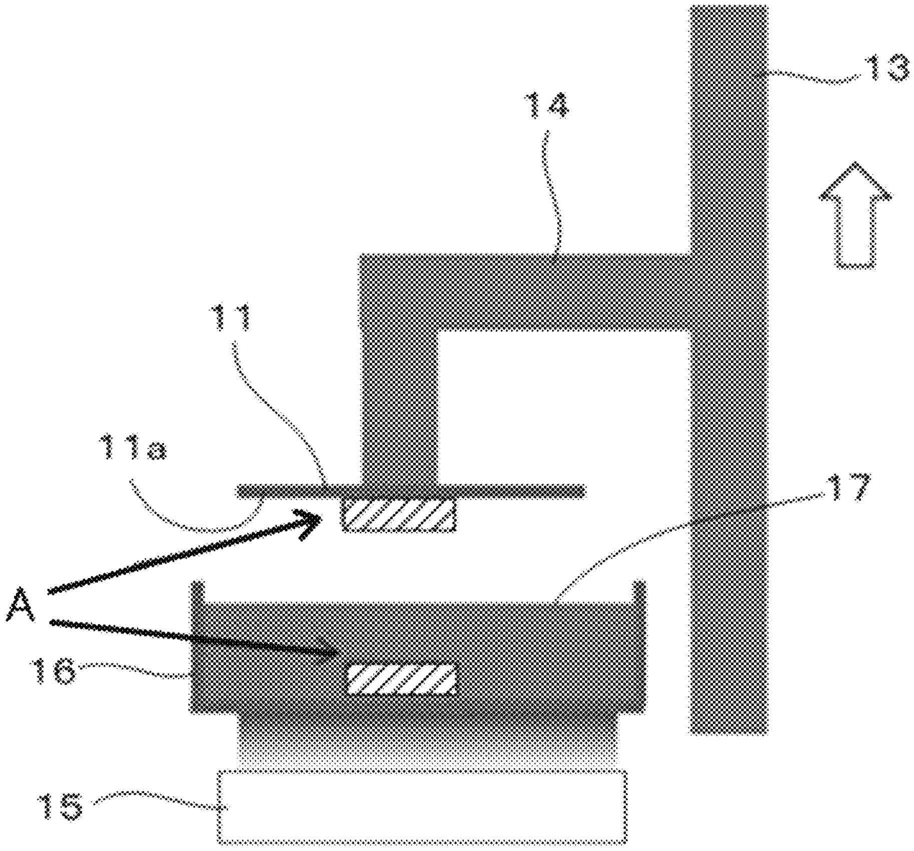
FIG. 5 is a schematic view illustrating an example of the production state of the three-dimensionally shaped object in Comparative Example 1.

A three-dimensionally shaped object having the shape and size as illustrated in FIGS. 2 and 4 was shaped with each of the obtained resin compositions for three-dimensional shaping using an apparatus for producing a three-dimensionally shaped object according to stereolithography of a bottom-up system (device name: ELEGOO MARS PRO UV, available from ELEGOO, INC.). Then, three-dimensional shaping was evaluated.

In Examples 1 to 3 and Comparative Example 4, three-dimensional shaping was correctly carried out as depicted in FIG. 2. In Comparative Example 3, moreover, three-dimensional shaping was correctly carried out as depicted in FIG. 4.

Figure 3:
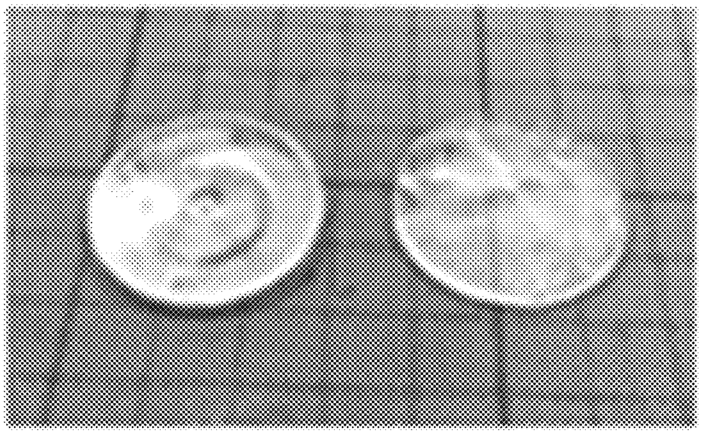
FIG. 3 is a photograph depicting an example of the three-dimensionally shaped object three-dimensionally shaped in Comparative Example 1.

In Comparative Example 1, conversely, the three-dimensionally shaped object collapsed as depicted in FIG. 3. This was because the three-dimensionally shaped object of Comparative Example 1 was extremely hard and became brittle so that the three-dimensionally shaped object broke at the thin part to split the three-dimensionally shaped object into the upper part and the bottom part.

Figure 6:
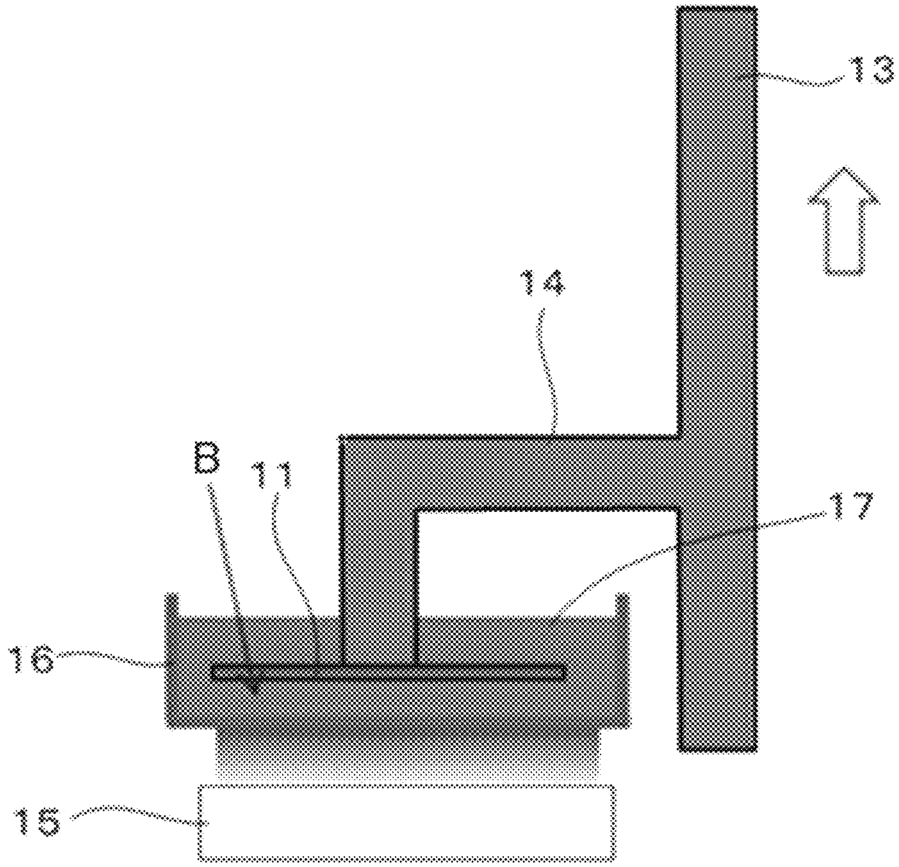
FIG. 6 is a schematic view illustrating an example of the production state of the three-dimensionally shaped object in Comparative Example 2.

In Comparative Example 2, moreover, the viscosity of the resin composition for three-dimensional shaping was high so that the resin composition for three-dimensional shaping could not flow into the area below the shaping platform 11 even when the shaping platform 11 was elevated, as illustrated with B in FIG. 6. Therefore, shaping could not be carried out.

<5% Weight Loss Temperature (Volatility)>

As an evaluation method for odor, a 5% weight loss temperature was regarded as "volatility," and the 5% weight loss temperature of the cured product was measured in the following manner. The higher the 5% weight loss temperature of the resin composition for three-dimensional shaping is, the less volatility the resin composition for three-dimensional shaping has, leading to low odor.

Each resin composition for three-dimensional shaping was placed and coated between 2 sheets of polyethylene terephthalate (PET) films, and the resin composition for three-dimensional shaping was irradiated with UV (0.5 $J/cm^2)_6$ times by a UV conveyor to obtain each cured product having a size of 3 cm×3 cm×0.5 mm (length×width×thickness).

Thermogravimetry (TGA: ThemoGarvimetric Analysis, device: TG-DTA 6000, available from Hitachi High-Tech Science Corporation) was performed on each of the obtained cured products to measure a 5% weight loss temperature.

<Measuring Methods of Glass Transition Temperature Tg and Elastic Modulus>

Loss modulus and storage modulus were measured by a dynamic mechanical analyzer (DMA: Dynamic Mechanical Analysis) (product name: RSA-3, available from TA Instruments) in the following measuring conditions. A temperature of the maximum point on the obtained loss tangent tan δ (loss modulus/storage modulus) was determined as a glass transition temperature. Moreover, the elastic modulus (representing the hardness of the cured product) at a temperature lower than the glass transition temperature was determined as elastic modulus in a glass region, and the elastic modulus (reflecting the crosslinking density) at a temperature equal to or higher than the glass transition temperature was determined as elastic modulus in a rubber equilibrium region. The elastic modulus at a temperature lower than the glass transition temperature Tg is preferably 1 GPa to 2.5 GPa. The elastic modulus at a temperature equal to or higher than the glass transition temperature Tg is preferably 5 MPa to 50 MPa. A sample having the size of 5 mm (width)×20 mm (length) was produced in the same manner as the sample for the 5% weight loss temperature, and the produced sample was used for measurement.

Measuring Conditions

Frequency: 1 Hz

Heating speed: 10° C./min.

Strain control: 0.1%

TABLE 1

| | | Ex. 1 | Ex. 2 | Ex. 3 |
|---|---|---|---|---|
| Main skeleton | | polycapro lactone | polycapro lactone | polycapro lactone |
| Raw materials for synthesis | Polycapro-lactone polyol | PCL205U | PCL305 | PCL308 |
| | Isocyanate (meth)acrylate | KARENZ AOI | KARENZ AOI | KARENZ AOI |

TABLE 1-continued

| | | Ex. 1 | Ex. 2 | Ex. 3 |
|---|---|---|---|---|
| Number of functional groups of polyfunctional urethane (meth)acrylate | | 2 | 3 | 3 |
| Molecular weight of polyfunctional urethane (meth)acrylate | | 784 | 931 | 1,231 |
| Molecular weight of polycaprolactone skeleton | | 530 | 550 | 850 |
| Amount of polyfunctional urethane (meth)acrylate | | 100 parts by mass | 100 parts by mass | 100 parts by mass |
| Photo-polymerization initiator | Omnirad TPO-H | 4 parts by mass | 4 parts by mass | 4 parts by mass |
| Viscosity at 25° C. | Pa · s | 1.4 | 7 | 5 |
| Three-dimensional shaping | Succeeded or not | succeeded | succeeded | succeeded |
| | State | excellent | excellent | excellent |
| 5% Weight loss temperature (volatility) | ° C. | 327 | 336 | 333 |
| Glass transition temperature (Tg) | ° C. | −17 | 30 | −2 |
| Elastic modulus (lower than Tg) | GPa | 1.9 | 2.1 | 1.3 |
| Elastic modulus (Tg or higher) | MPa | 13 | 38 | 26 |

TABLE 2

| | | Comp. Ex. 1 | Comp. Ex. 2 | Comp. Ex. 3 | Comp. Ex. 4 |
|---|---|---|---|---|---|
| Main skeleton | | polycapro lactone | polycapro lactone | Commercially available resin composition for 3D printers (Elegoo) | Commercially available resin composition for 3D printers (eSun) |
| Raw materials for synthesis | Polycaprolactone polyol | PCL303 | PCL312 | | |
| | Isocyanate (meth)acrylate | KARENZ AOI | KARENZ AOI | | |
| Number of functional groups of polyfunctional urethane (meth)acrylate | | 3 | 3 | | |
| Molecular weight of polyfunctional urethane (meth)acrylate | | 681 | 1631 | | |
| Molecular weight of polycaprolactone skeleton | | 300 | 1250 | | |
| Amount of polyfunctional urethane (meth)acrylate | | 100 parts by mass | 100 parts by mass | | |
| Photopolymerization initiator | Omnirad TPO-H | 4 parts by mass | 4 parts by mass | | |
| Viscosity at 25° C. | Pa · s | 18 | 19 | 0.3 | 0.17 |
| Three-dimensional shaping | Succeeded or not | not succeeded | not succeeded | succeeded | succeeded |
| | State | broken during printing | incapable of shaping due to high viscosity | excellent | excellent |
| 5% Weight loss temperature (volatility) | ° C. | 310 | 334 | 169 | 133 |
| Glass transition temperature (Tg) | ° C. | 71 | −22 | 83 | 85 |
| Elastic modulus (lower than Tg) | GPa | 1.7 | 1.1 | 2.0 | 1.5 |
| Elastic modulus (Tg or higher) | MPa | 72 | 13 | 85 | 45 |

The details of each component in Tables 1 and 2 are as follows.

PCL205U: PLACCEL 205U, polycaprolactone diol, molecular weight of 530, available from Daicel Corporation PCL303: PLACCEL 303, polycaprolactone triol, molecular weight of 300, available from Daicel Corporation PCL305: PLACCEL 305, polycaprolactone triol, molecular weight of 550, available from Daicel Corporation PCL308: PLACCEL 308, polycaprolactone triol, molecular weight of 850, available from Daicel Corporation PCL312: PLACCEL 312, polycaprolactone triol, molecular weight of 1,250, available from Daicel Corporation KARENZ AOI: 2-isocyanatoethyl acrylate, available from Showa Denko K.K.

Omnirad TPO-H, 2,4,6-trimethylbenzoyl-diphenylphosphine oxide, available from IGM Resins B.V.

According to the results presented in Tables 1 and 2, excellent three-dimensional shaping was carried out in Examples 1 to 3 because the resin composition did not include a low molecular weight monofunctional monomer and included a single component that was a polyfunctional urethane (meth)acrylate having a molecular weight of 700 or greater and 1,300 or less. Moreover, the 5% weight loss temperature measured by thermogravimetry (TGA) was 300° C. or higher and the resin composition had low volatility, thus generation of odor was minimized. Moreover, it was assumed that the skin irritability of the resin composition was low because the polyfunctional urethane (meth) acrylate had a large molecular weight and did not easily penetrate into skin. Since the polyfunctional urethane (meth) acrylate included the polycaprolactone skeleton, moreover, the three-dimensionally shaped object had elasticity without any brittleness.

In Comparative Example 1, moreover, the ratio (300/720) of the caprolactone skeleton included in a molecule of the polyfunctional urethane (meth)acrylate including the polycaprolactone skeleton was small, thus flexibility of the shaped object was insufficient, and the elastic modulus at the temperature equal to or higher than the glass transition temperature Tg was high. Therefore, the resulting three-dimensionally shaped object was excessively hard so that the three-dimensionally shaped object was broken during shaping.

In Comparative Example 2, the molecular weight of the polyfunctional urethane (meth)acrylate including the polycaprolactone skeleton was large, so that the viscosity of the resin composition for three-dimensional shaping was high and shaping could not be carried out as described above.

In Comparative Examples 3 and 4, the resin composition for three-dimensional shaping had a low viscosity, the glass transition temperature Tg of the cured product was high, and three-dimensional shaping could be carried out. However, the 5% weight loss temperature measured by thermogravimetry (TGA) was 200° C. or lower, which lead to high volatility, and the low molecular weight monofunctional monomer (acryloylmorpholine) was included so that strong odor was released, making the composition unsuitable for domestic use.

INDUSTRIAL APPLICABILITY

The resin composition for three-dimensional shaping of the present invention can stably shape a desired three-dimensionally shaped object having low odor and excellent mechanical properties. Therefore, the resin composition for three-dimensional shaping of the present invention is suitably used for production of a three-dimensionally shaped object, such as an artificial bait, etc.

DESCRIPTION OF SYMBOLS

11 shaping platform
11*a* shaping surface
12 three-dimensionally shaped object
13 linear guide
14 arm
15 UV light source
16 shaping tank
17 resin composition for three-dimensional shaping (liquid state)

The invention claimed is:

1. A resin composition for three-dimensional shaping, the resin composition comprising:

a polyfunctional urethane (meth)acrylate having a molecular weight of 700 or greater and 1,300 or less, wherein an amount of the polyfunctional urethane (meth) acrylate is 90% by mass or greater relative to a total amount of the resin composition for three-dimensional shaping.

2. The resin composition for three-dimensional shaping, according to claim 1, wherein the polyfunctional urethane (meth)acrylate includes a polycaprolactone skeleton.

3. The resin composition for three-dimensional shaping, according to claim 2, wherein the polycaprolactone skeleton has a molecular weight of 500 or greater and 1,000 or less.

4. The resin composition for three-dimensional shaping, according to claim 2, wherein the polyfunctional urethane (meth)acrylate including the polycaprolactone skeleton is represented by General Formula (1) or General Formula (2) below, General Formula (1)

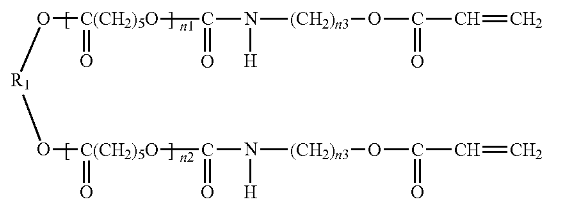

where, in General Formula (1), $R_1$ s a straight-chain alkyl group or a straight-chain alkyl ether group, n1+n2 is an integer of 2 or greater and 9 or less, and n3 is an integer of 1 or greater, General Formula (2)

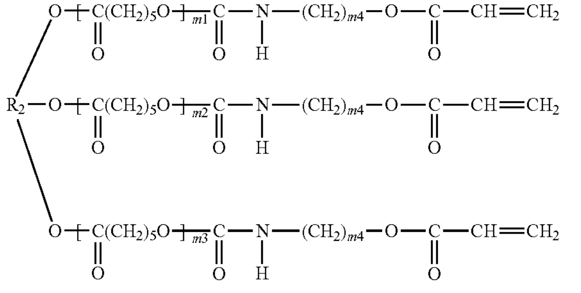

where, in General Formula (2), $R_2$ is a branched-chain alkyl group, m1+m2+m3 is an integer of 3 or greater and 9 or less, and m4 is an integer of 1 or greater.

5. The resin composition for three-dimensional shaping, according to claim 1, the resin composition further comprising:

a photopolymerization initiator.

6. The resin composition for three-dimensional shaping, according to claim 1, wherein the resin composition for three-dimensional shaping has a viscosity of 0.1 Pa·s or greater and 10 Pa·s or less at 25° C.

* * * * *